Sept. 17, 1946.   C. B. SPASE   2,407,727
CLUTCH
Filed Jan. 8, 1944
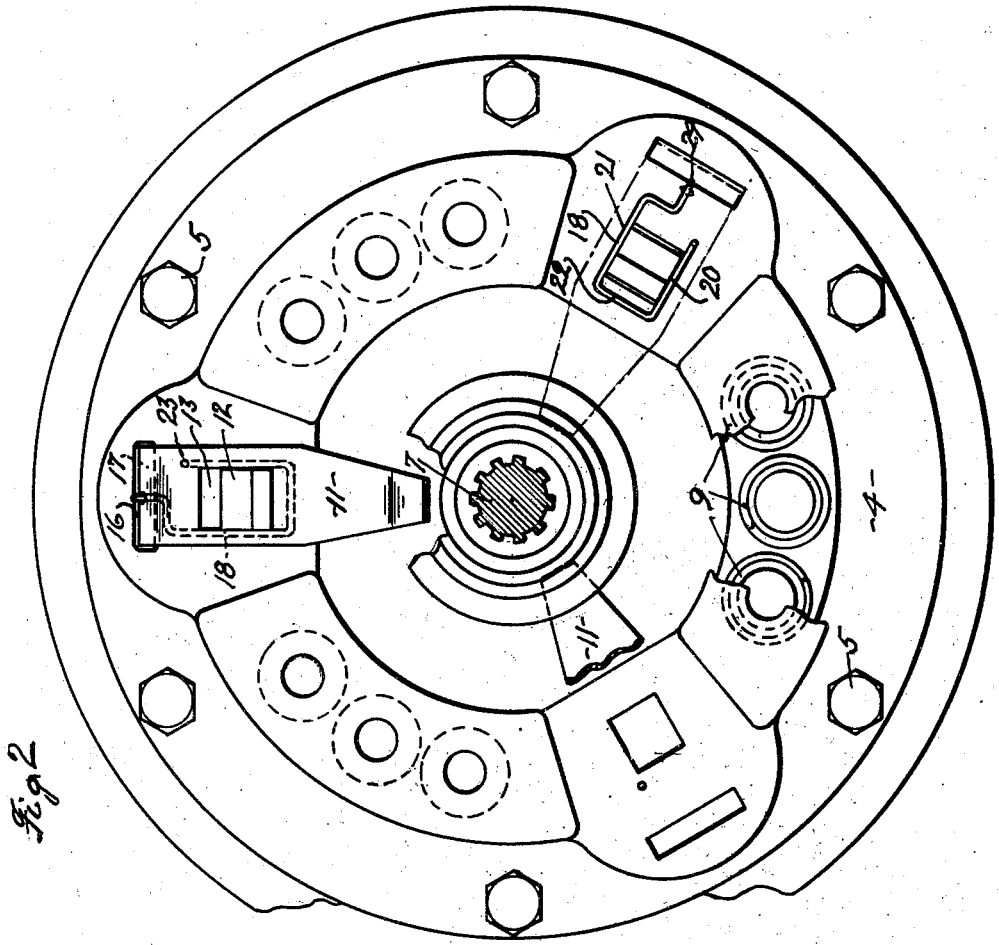
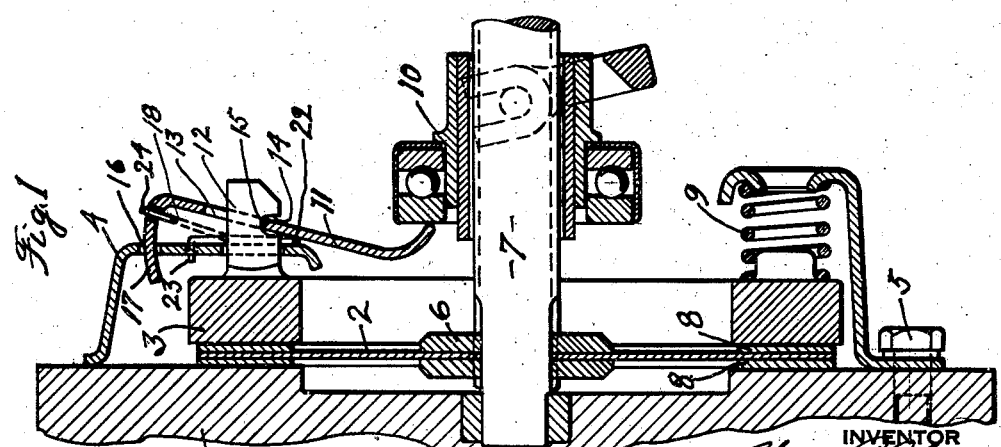
INVENTOR
Charles B Spase
BY
Byrdell & Thompson
Attys Patented Sept. 17, 1946

2,407,727

UNITED STATES PATENT OFFICE 2,407,727

CLUTCH

Charles B. Spase, Nedrow, N. Y., assignor to Lipe-Rollway Corporation, Syracuse, N. Y., a corporation of New York Application January 8, 1944, Serial No. 517,556

7 Claims. (Cl. 192—99)

This invention relates to friction clutches of the type used in motor vehicles, and has for its object a simple and economical construction by which the clutch levers, the pressure ring and the back plate are assembled and held assembled without the use of pins, rivets, screws, pivots, etc., but by interlocking engagement of the levers and pressure ring, and the levers and the back plate.

The invention consists in the novel features and in the combinations and constructions hereinafter set forth and claimed.

In describing this invention, reference is had to the accompanying drawing in which like characters designate corresponding parts in all the views.

Figure 1 is a diametrical sectional view of a clutch embodying this invention.

Figure 2 is a rear elevation, looking to the left in Figure 1, partly broken away and partly in section.

The invention comprises means for coupling the clutch levers to the pressure ring by interlocking them together, the interlocking being effected by a relative endwise or radial movement of the radial clutch levers and the pressure ring, and means for supporting the clutch levers from the back plate and holding them in interlocking engagement with the pressure ring by interlocking means between the back plate and the levers arranged to interlock when the levers are coupled to the pressure ring.

The invention further preferably includes anti-rattling springs, each having arms extending through or hooking into openings in the back plate, and the levers, so as to be assembled without screws, pins, and the like, the springs also having portions located between the back plate and the levers to act as fulcrums for the levers.

1 and 2 designate, respectively, the driving and driven members of the clutch. 3 designates the pressure ring, which is rotatable with the driving member, and 4, the back plate secured in any suitable manner, as by screws 5, to the driving member 1. The driving member 1 is usually the fly wheel of the engine of the vehicle. The driven member is here shown as a plate or disk having a hub 6 slidably splined on the clutch shaft 7 and also having friction facings 8 on opposite sides of its outer margin, which are compressed between the pressure ring 3 and the driving member 1 to engage the clutch. It is so pressed by suitable spring means, as a plurality of springs 9 interposed between the back plate and the pressure ring. The back plate is preferably formed up of sheet metal.

10 designates the throw-out collar operated in any well-known manner from the clutch pedal to throw out or disengage the clutch against the action of springs 9. The motion of the throw-out collar is transferred to the pressure ring through radially-extending, multiplying levers 11.

The levers and the pressure ring have means for interlocking for coupling them together in assembled relation by endwise movement of the levers. The back plate and the levers have means for interlocking to hold the levers from displacement from their assembled relation with the pressure ring or to hold them from shifting endwise inwardly when assembled with the pressure ring. The levers are brought into interlocking engagement with the means or arms on the pressure ring by radial shifting movement of the levers, preferably an outward movement. The levers are held in interlocking engagement with said arms by a rocking movement which interlocks the levers with the back plate. The rocking movement to interlock the levers and the back plate is in the same direction as the normal operating movement of the levers to engage and disengage the clutch, but is greater than the normal operating movement.

The pressure ring is provided with rearwardly extending arms 12 extending through openings in the back plate and coacting or interlocking with the levers 11 respectively. One set of these coacting parts, here shown as the levers 11, is formed with passages 13 through which the other of the coacting parts, that is, the arms 12, extend. These arms are provided with notches 14 for receiving a transverse edge or shoulder 15 on the levers, so that the levers are crotched in the notches. The passage 13 is wide enough to permit this endwise movement to crotch the levers in the notches.

The interlocking means between the back plate 4 and the levers 11 to hold the levers in their assembled position are operable by a rocking movement of the levers on their fulcrums greater than the normal operating movement of the levers. As here illustrated, the back plate is formed with openings or slots 16, one for each lever. The levers are provided with angular arms 17 at their outer ends extending in a general direction parallel to the axis of the clutch and being slightly arcuate about the fulcrum axis of the levers 11, the arms being arranged to come into register with the slots 16 when the levers are interlocked with the notches 14 of the arms 12. Thus, the levers, when interlocked with the arms 12, are held from radial movement inwardly.

Each of the levers is acted upon by an anti-rattling spring 18 interposed between the back plate and the lever and having an interlocking engagement or hooking engagement with the back plate and the levers. The spring here shown is of a single strand or wire shaped to have arms 20 and 21 interlocked with the back plate and the adjacent lever respectively, and an intermediate portion 22 arranged to act as a fulcrum for the lever. The arm 20 is formed with an angular end 23 which extends into or hooks into an opening in the back plate. The arm 21 is formed with an end 24 which extends through or hooks into a passage in the lever 11 or the arm 17 thereof, these arms being tensioned to press in opposite directions, and thus hold the levers from looseness.

In assembling, the pressure ring may be mounted in the back plate by passing the arms 12 through the passages therefor in the back plate and the levers with the springs interlocked therewith applied by moving the springs outward radially, so that the springs may interlock with the back plate at 23 and the arms 17 may be alined with and move into the passages 16 of the back plate. Hence, the pressure ring, back plate and clutch levers are easily assembled without the use of pins, pivots, screws, rivets, etc. They may be disassembled by a reverse of these movements.

What I claim is:

1. In a friction clutch including driving and driven members, a pressure ring rotatable with the driving member and thrusting toward the same to clutch the driving and driven members together, a back plate, spring means acting on the pressure ring to engage the clutch, a throw-out collar, and radially extending levers between the throw-out collar and the pressure ring operable to disengage the clutch; the combination of said pressure ring having rearwardly extending arms and the levers interlocking with the arms against displacement in a direction parallel to the axis of the clutch and placeable into such interlocking engagement by a radial endwise movement of the levers, the levers also having means slidably interlocking with the back plate for holding the levers in interlocking engagement with said arms against radial displacement during the normal operation of the levers.

2. In a friction clutch including driving and driven members, a pressure ring rotatable with the driving member and thrusting toward the same to clutch the driving and driven members together, a back plate, spring means acting on the pressure ring to engage the clutch, a throw-out collar, and radially extending levers between the throw-out collar and the pressure ring operable to disengage the clutch; the combination of rearwardly extending arms on the pressure ring extedning through the back plate, one arm for each lever, the arms and the levers having means for interlocking, one set of said interlocking parts being formed with passages through which the others of said parts extend, and the arms being formed with notches and the levers with portions for interlocking in the notches upon endwise shifting movement of the levers, the back plate having openings therein, and the levers having arms extending in a general direction parallel to the axis of the clutch and angular to the major part of the levers for entering said openings and interlocking the back plate and the levers together, when the levers are interlocked in said notches.

3. In a friction clutch including driving and driven members, a pressure ring rotatable with the driving member and thrusting toward the same to clutch the driving and driven members together, a back plate, spring means acting on the pressure ring to engage the clutch, a throw-out collar, and radially extending levers between the throw-out collar and the pressure ring operable to disengage the clutch; the combination of rearwardly extending arms on the pressure ring extending through the back plate, one arm for each lever, the arms and the levers having means for interlocking upon a radial shifting movement of the levers, the levers and the back plate having means for interlocking to support the levers and hold them from endwise movement, when in interlocking engagement with said arms, and an anti-rattling spring having arms hooking into openings in the back plate and the levers respectively for securing the spring assembled with the back plate and the levers, and intermediate portions of the springs extending between the back plate and the levers and serving as fulcrums for the levers.

4. In a friction clutch including driving and driven members, a pressure ring rotatable with the driving member and thrusting toward the same to clutch the driving and driven members together, a back plate, spring means acting on the pressure ring to engage the clutch, a throw-out collar, and radially extending levers between the throw-out collar and the pressure ring operable to disengage the clutch; the combination of rearwardly extending arms on the pressure ring extending through the back plate, one arm for each lever, the arms and the levers having means for interlocking, one set of said interlocking parts being formed with passages through which the others of said parts extend, and the arms being formed with notches and the levers with portions for interlocking in the notches upon endwise shifting movement of the levers, the back plate and the levers having means for coming into interlocking engagement when the levers are interlocked with said arms, and anti-rattling springs having arms hooking into the back plate and the levers respectively, the springs having intermediate portions interposed between the levers and the back plate and serving as fulcrums for the levers.

5. In a friction clutch including driving and driven members, a pressure ring rotatable with the driving member and thrusting toward the same to clutch the driving and driven members together, a back plate, spring means acting on the pressure ring to engage the clutch, a throw-out collar, and radially extending levers between the throw-out collar and the pressure ring operable to disengage the clutch; the combination of rearwardly extending arms on the pressure ring extending through the back plate, the arms being formed with notches in their sides toward the axis of the clutch, the back plate being formed with slots therethrough located radially outward relatively to the rearwardly extending arms of the pressure ring, the levers having angular arms slidable through the slots and the levers also having portions extending into the notches of the rearwardly extending arms, the slots being located to receive the angular arms of the levers, when said portions of the levers are located in the notches.

6. In a friction clutch including driving and driven members, a pressure ring rotatable with the driving member and thrusting toward the same to clutch the driving and driven members together, a back plate, spring means acting on the pressure ring to engage the clutch, a throw-out collar, and radially extending levers between the throw-out collar and the pressure ring operable to disengage the clutch; the combination of rearwardly extending arms on the pressure ring extending through the back plate, the arms being formed with notches in their sides toward the axis of the clutch, the back plate being formed with slots therethrough located radially outward relatively to the rearwardly extending arms of the pressure ring, the levers having angular arms slidable through the slots and the levers also having portions extending into the notches of the rearwardly extending arms, the slots being located to receive the angular arms of the levers, when said portions of the levers are located in the notches, and anti-rattling springs for the levers, each spring being anchored at its opposite ends to the back plate and to the companion lever.

7. In a friction clutch including driving and driven members, a pressure ring rotatable with the driving member and thrusting toward the same to clutch the driving and driven members together, a back plate, spring means acting on the pressure ring to engage the clutch, a throw-out collar, and radially extending levers between the throw-out collar and the pressure ring operable to disengage the clutch; the combination of rearwardly extending arms on the pressure ring extending through the back plate, the arms being formed with notches in their sides toward the axis of the clutch, the back plate being formed with slots therethrough located radially outward relatively to the rearwardly extending arms of the pressure ring, the levers having angular arms slidable through the slots and the levers also having portions extending into the notches of the rearwardly extending arms, the slots being located to receive the angular arms of the levers, when said portions of the levers are located in the notches, and anti-rattling springs for the levers, each spring being anchored at its opposite ends to the back plate and to the companion lever, a portion of each spring serving as a fulcrum on the back plate for the companion lever.

CHARLES B. SPASE.